Sept. 11, 1923.
O. H. BANKER
BROACHING MACHINE
Filed Nov. 25, 1921
1,467,525
2 Sheets-Sheet 1

Inventor
Oscar H. Banker
By Young and Young
Attorneys

Sept. 11, 1923.  
O. H. BANKER  
BROACHING MACHINE  
Filed Nov. 25, 1921  
1,467,525  
2 Sheets-Sheet 2

Inventor
Oscar H. Banker

Witness
T. P. Britt

By Young & Young
Attorneys

Patented Sept. 11, 1923.

1,467,525

UNITED STATES PATENT OFFICE.

OSCAR H. BANKER, OF RACINE, WISCONSIN, ASSIGNOR TO RACINE TOOL AND MACHINE COMPANY, OF RACINE, WISCONSIN.

BROACHING MACHINE.

Application filed November 25, 1921. Serial No. 517,670.

*To all whom it may concern:*

Be it known that I, OSCAR H. BANKER, a citizen of Armenia, and resident of Racine, in the county of Racine and State of Wisconsin, have invented certain new and useful Improvements in Broaching Machines; and I do hereby declare that the following is a full, clear, and exact description thereof.

My invention consists in certain new and useful improvements relating to broaching machines and the like, and more particularly to the feeding mechanism for feeding the work in contact with the broaching tool or other tool for performing work.

The general object of the invention is to provide means for progressively feeding a table which carries the work into contact with the tool during its active stroke and for retracting the table during the return stroke.

A further object of the invention is to provide means of this character which may be universally adjusted to accommodate whatever work is to be performed and to render the machine entirely automatic in its nature.

Other and more specific objects relate to various improvements in the structural details of the mechanism, which will be hereinafter described.

In describing my invention, reference will be had to the accompanying drawings, in which—

Figure 1:
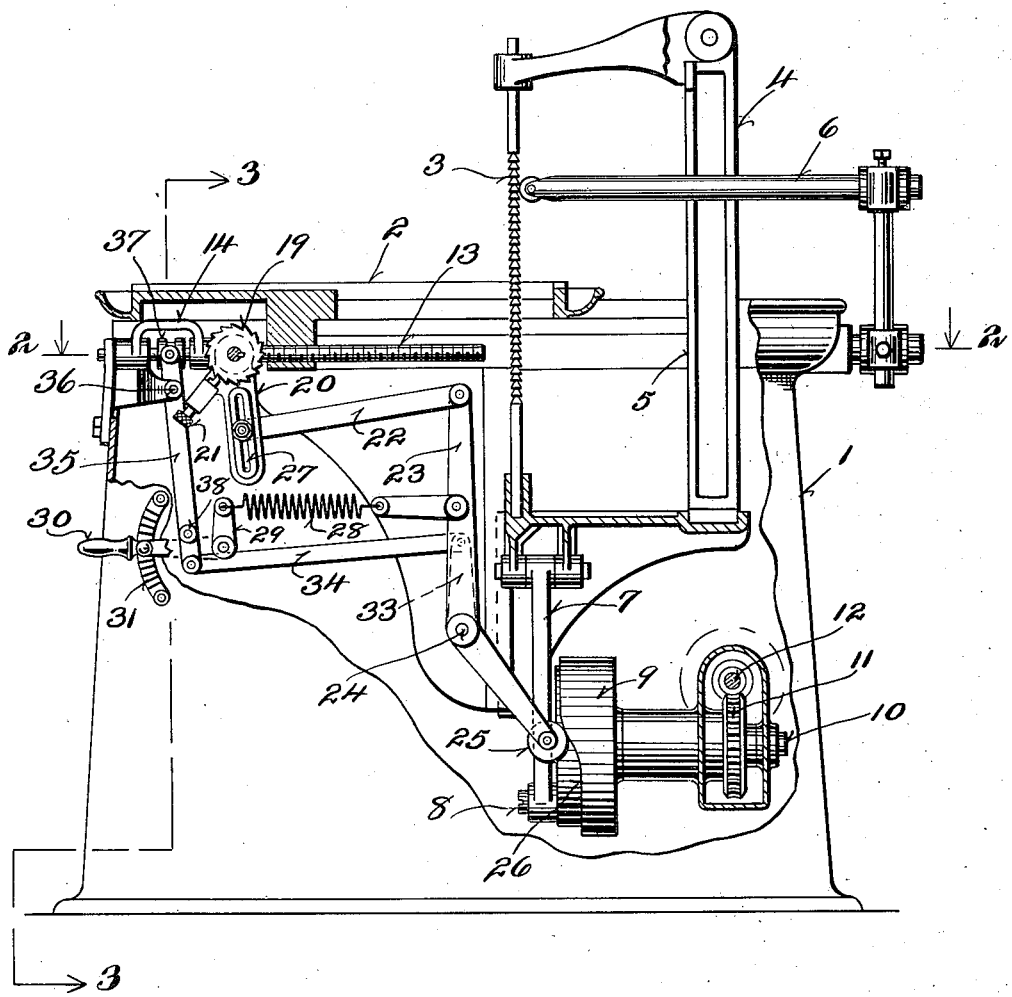
Figure 1 is a longitudinal sectional view through the machine which comprises my invention.
Figure 2:
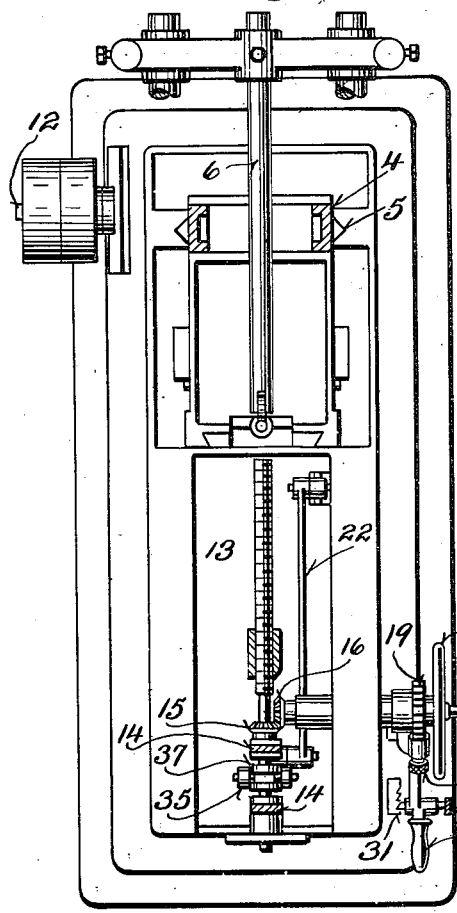
Figure 2 is a sectional plan view on the line 2—2 of Figure 1.
Figure 3:
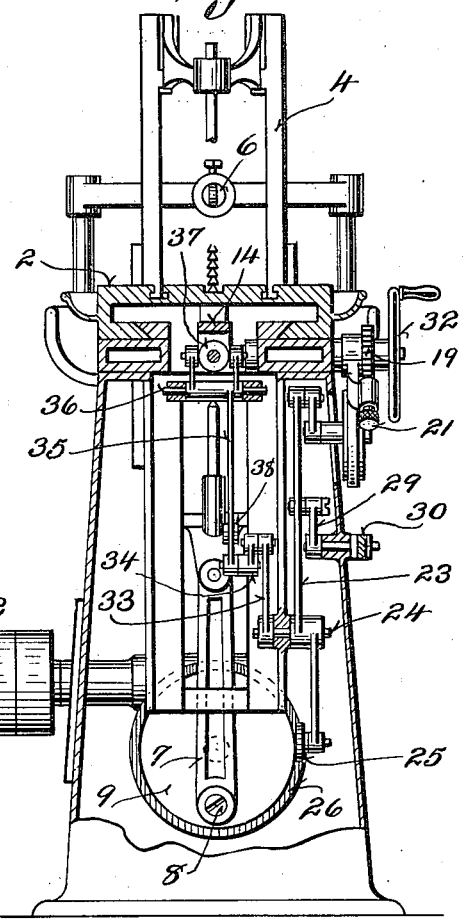
Figure 3 is a transverse sectional view on the line 3—3 of Figure 1.
Figure 4:
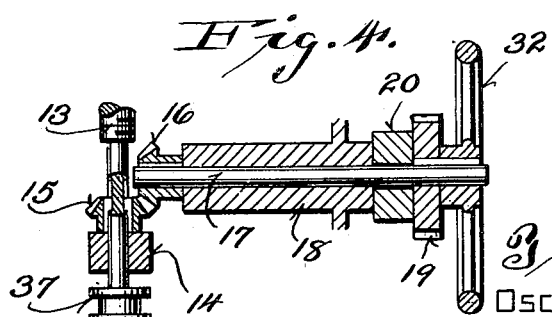
Figure 4 is a sectional detailed view of certain parts of the said mechanism.

Referring specifically to the drawings, the numeral 1 designates the supporting frame on which is slidably mounted, a feed table 2 on which is carried the material to be worked upon. At the rear of this table, a broaching tool 3, or the like, is secured in the frame 4 which is mounted for vertical reciprocation in the guideways 5. A universally adjustable arm 6 is provided for guiding and reinforcing the tool 3. The frame 4 is reciprocated by means of a pitman 7 which is journaled at one end to a wrist pin 8 carried by a crank disk 9, which is secured to a horizontal shaft 10. This shaft is driven preferably by a worm gear 11 operatively connected to the main power shaft 12.

While the tool 3 is being reciprocated by the means above described, the table 2 is gradually advanced by means of the feed screw 13, which is operatively connected therewith, and journalled in a yoke 14 which is secured to the supporting frame. The feed screw has a beveled gear 15 splined thereto, and held by one arm of the yoke in engagement with a bevel gear 16, secured to the end of a shaft 17, which is journalled in the bearing 18 on the supporting frame. The feed screw and the shaft 17 are adapted to be driven intermittently by a ratchet wheel 19, secured to the latter. An arm 20 is journalled on the shaft 17 and operates the ratchet wheel by means of a pawl 21, which engages the teeth of the ratchet wheel to advance the same when the arm 20 is swung in one direction and slips over the teeth when the arm 20 is swung in the opposite direction.

The arm 20 is oscillated by means of a link 22 which connects it to one arm of a lever 23, which is journalled on a stub shaft 24 and provided at its other end with a roller 25 which rides over the cam face 26 on the peripheral portion of the crank disk 9 when the latter rotates. Thus at each revolution of the crank disk, the arm 20 will be oscillated to and fro, the extent of the oscillation being adjustable by means of the slot 27 therein, to which the end of the link 22 is connected.

The lever 23 is positively rocked in one direction by the cam face 26, and is returned by the spring 28 which is connected at one end of the lever 23 and at its other end to an arm 29 which is connected with a hand lever 30 which co-operates with the segment 31 for the purpose of adjusting the tension of the spring.

It will be seen therefore, that during the reciprocation of the tool, the work table will be gradually advanced by the step by step rotation of the feed screw 13, which advance is under influence of the spring 28 so that the feed will take place only as fast as the work is being performed.

The cam face 26 is so formed that the feed table will be permitted to advance under influence of the spring 28 at the beginning of the active stroke of the tool, while the lever 23 is positively rocked in the opposite direction at the beginning of the return movement of the tool. This means comprises an arm 33 which is secured to the stub shaft 24 and connected by a link 34 with one end of a lever 35 which is pivoted at 36. The other end of the lever is bifurcated and engages a grooved collar 37 which is secured to the screw 13. Thus it will be seen that each time the lever 23 is rocked, the lever 35 will advance and retract the feed screw and the table 2. One or more additional holes 38 may be provided on the lever 35 for the purpose of varying the amount of this motion of the feed screw and table.

From the foregoing description it will be seen that I have provided means by which the work table will be slowly advanced step by step to an extent corresponding with the amount of work performed. The table will be yieldably held with the work against the tool during the active stroke of the latter, and will be positively retracted at the beginning of the return stroke of the two.

The means which I have provided for effecting this feed is entirely automatic in its operation and uniformly adjustable. When the work is first inserted, the table may be advanced by means of the hand wheel 32, until the tool engages the work. When it is desired to change the work, the lever 23 may be moved and secured in a position to hold the table retracted with the roller 25 beyond reach of the cam face 26. Thus the work may be changed without stopping the operation of the tool.

I claim:

1. In a machine of the character described, a table, a broaching tool, means for reciprocating the latter in a plane at right angles to the table, a screw feed for advancing the table and means for actuating said screw feed step by step in synchronism with the reciprocation of the broaching tool.

2. In a machine of the class described, a horizontal table, a broaching tool, means for reciprocating the tool perpendicularly across the table, a feed screw operatively connected with the table, a ratchet geared to said screw and means for rotating said ratchet and screw intermittently in a direction to advance the table, said last named means being operatively connected with the reciprocating means to operate in synchronism therewith.

3. In a device of the character described, a work table, a feed screw operatively connected therewith, a shaft geared to said feed screw and having a ratchet wheel secured thereon, an arm loosely mounted on said shaft and having a pawl connection with said ratchet wheel a rotatable disk having a cam thereon, a lever operable by the cam upon rotation of the disk to swing said arm to operate the feed screw and advance the table and means to return the lever to its initial position and simultaneously retract the table.

In testimony that I claim the foregoing I have hereunto set my hand at Racine, in the county of Racine and State of Wisconsin.

OSCAR H. BANKER.